United States Patent [19]

Diaz et al.

[11] Patent Number: 4,717,994
[45] Date of Patent: Jan. 5, 1988

[54] CURRENT MODE CONTROL FOR DC CONVERTERS OPERATING OVER 50% DUTY CYCLE

[75] Inventors: Bonifacio Diaz, Chicago; Anand K. Upadhyay, Mount Prospect, both of Ill.

[73] Assignee: Zenith Electronics Corporation, Glenview, Ill.

[21] Appl. No.: 940,699

[22] Filed: Dec. 11, 1986

[51] Int. Cl.⁴ .......................................... H02M 3/337
[52] U.S. Cl. ...................................... 363/21; 363/56; 363/132; 323/285; 323/288; 323/299
[58] Field of Search .................. 363/17, 21, 56, 98, 363/132; 323/285, 288, 299

[56] References Cited

U.S. PATENT DOCUMENTS

| | | | |
|---|---|---|---|
| 3,959,716 | 5/1976 | Gilbert, Jr. et al. | 323/288 |
| 4,177,389 | 12/1979 | Schott | 363/21 X |
| 4,415,960 | 11/1983 | Clark, Jr. | 363/21 |
| 4,564,800 | 1/1986 | Jurgans | 363/17 X |
| 4,586,119 | 4/1986 | Sutton | 363/17 |

OTHER PUBLICATIONS

Carl Nelson, "Switching Controller Chip Handles 100 W from a 5-Pin Package", Dec. 1984, p. 73.

Primary Examiner—Patrick R. Salce
Assistant Examiner—Kristine L. Peckman

[57] ABSTRACT

In a capacitively coupled DC-to-DC converter employing a pair of switching elements alternately rendered conductive, instabilities arising from current mode control are compensated for by detecting and controlling the amount of charge transferred by each switching element to a respective output capacitor associated therewith rather than the conduction period of each switching element. Converter instabilities arising from switching element duty cycles in excess of 50% are compensated for by integrating the sensed inductor current which represents the average inductor output current rather than its instantaneous value. An integrating network is discharged to 0 at the end of each cycle in resetting the sensed inductor current to 0 to prevent converter runaway when the switching element duty cycle exceeds 50%. This invention is applicable for all types of DC converters operating with a duty cycle greater than 50%.

14 Claims, 5 Drawing Figures

CURRENT MODE CONTROL FOR DC CONVERTERS OPERATING OVER 50% DUTY CYCLE

BACKGROUND OF THE INVENTION

This invention relates generally to power supplies incorporating a DC-to-DC converter and is particularly directed to a DC converter operating at a duty cycle greater than 50% and employing current mode control.

Switchmode power supplies have been rapidly replacing their linear counterparts in the past several years. Significant improvements in efficiency and power density have been the primary advantages of switchmode power supplies. Linear power supplies, however, are still being used in applications where switchmode performance, i.e., the ability to respond to changes in input voltage and output load, is not satisfactory.

The performance of a switchmode power supply is primarily determined by its control section. Current mode control of the switchmode power supply represents a significant improvement over conventional voltage mode control. Whereas conventional voltage mode control relies solely on output voltage feedback, current mode control reacts (turns power switches on/off) to the output inductor current as well, resulting in improved performance. Since the inductor current ramp is a function of the input voltage, single switching cycle correction, which represents optimum power supply operation, to any variation in input voltage is automatically accomplished through inductor current feedback. In current mode control, the inductor current is permitted to vary only as much as needed since the op-amp error voltage $V_e$ limits the inductor current. Conventional voltage mode control allows the inductor current to react at will, resulting in lower reliability and inferior transient response. In current mode control, the inductor current cannot change until the error voltage has changed.

Applying current mode control to a half-bridge converter in the power supply results in a runaway condition wherein one of the capacitors in a voltage divider circuit within the converter completely discharges. This condition is due to different length conduction periods of the two switching elements within the half-bridge converter, across which the two aforementioned capacitors are coupled. This difference in conduction times of the two switching elements may arise from various operating parameters such as propagation delays in the signal paths to each of the switching elements, differences in the respective switching times of the two switching elements, or sub-harmonic oscillations of the voltage-regulating feedback loop employed in voltage mode control. One approach to correcting for this charge versus discharge imbalance condition in the capacitively-coupled half-bridge converter is described in "How To Prevent Runaway Conditions In Half-Bridge Converters Operating With Current-Mode Control," by Herman Neufeld, to be presented at SA-TECH '86 Conference (Oct. 29, 1986). This approach involves measuring the conduction times of each of the switching elements in determining the relative charge on the capacitors coupled to each of the switching elements. By regulating the conduction times of the switching elements, the discharge rate on each of the capacitors is controlled until both capacitors attain equal voltages. While this approach operates well where the difference in the charge across the two capacitors arises from a difference in the conduction periods of the two switching elements, this approach does not take into account tolerance differences between the two capacitors, individual operating characteristics of the two switching elements, or a mismatch in the voltage across each of the capacitors. Another approach to avoiding this runaway condition which makes use of a balanced winding arrangement in the converter's output transformer is disclosed in Unitrode Power Supply Design Seminar, Oct. 1986, pgs. 1–14 and 1–15.

Inherent to current mode control is instability when the duty cycle of the switching elements exceeds 50%. This instability arises from the fact that the peak inductor current determines the ON time of a switching element and that a small change in the inductor current increases with each switching cycle when the duty cycle is greater than 50%. This may be shown by comparing FIGS. 1a and 1b which illustrate the manner in which a small inductor current perturbation $\Delta I_o$ is affected with each switching cycle when the duty cycle is less than 50% and greater than 50% respectively. The conventional way to correct for this instability is to add a ramp to the current sense waveform so that the peak inductor current no longer determines switching element ON time. Thus, to the first current feedback correction signal is added a second compensating ramp correction signal. This approach for improving operation of the current mode half-bridge converter is described in Unitrode Application Note U-97 entitled "Modelling, Analysis And Compensation Of The Current-Mode Controller" by Barney Holland.

Because half-bridge converters are operated with continuous inductor current, the inductor current reflected back into the converter's primary winding appears as a ramp signal superimposed upon a pedestal. If the inductor DC current is large with respect to its AC component, the converter's control circuitry will be susceptible to noise. A small noise spike will result in significant pulse width variation, as illustrated in FIGS. 2a and 2b. Thus, prior art slope compensation attempts to stabilize half-bridge converter operation have met with only limited success because of their high susceptibility to noise.

The present invention is intended to overcome the aforementioned limitations of the prior art by eliminating instabilities in a DC converter power supply incorporating current mode control and operating at greater than 50% duty cycle by detecting and controlling the amount of charge transferred by each switching element in the converter. Although disclosed primarily in terms of use with a half-bridge converter, the present invention is not limited to this arrangement and has application to virtually any type of DC converter employing current mode control.

OBJECTS OF THE INVENTION

Accordingly, it is an object of the present invention to provide an improved DC power supply.

It is another object of the present invention to provide more stable operation in a switchmode power supply which includes two switching elements.

It is another object of the present invention to provide more stable operation in a DC converter employing current mode control.

A further object of the present invention is to provide a current feedback signal for regulating the operation of a half-bridge converter and other switching converters having switching elements which operate at a duty cycle in excess of 50%.

Yet another object of the present invention is to compensate for operating instabilities in a half-bridge converter arising from operating differences in its two switching elements as well as in the respective circuitry associated with each of these switching elements.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, in which:

DETAILED DESCRIPTION OF THE PREFERRED EMBODIMENT

Figure 3:
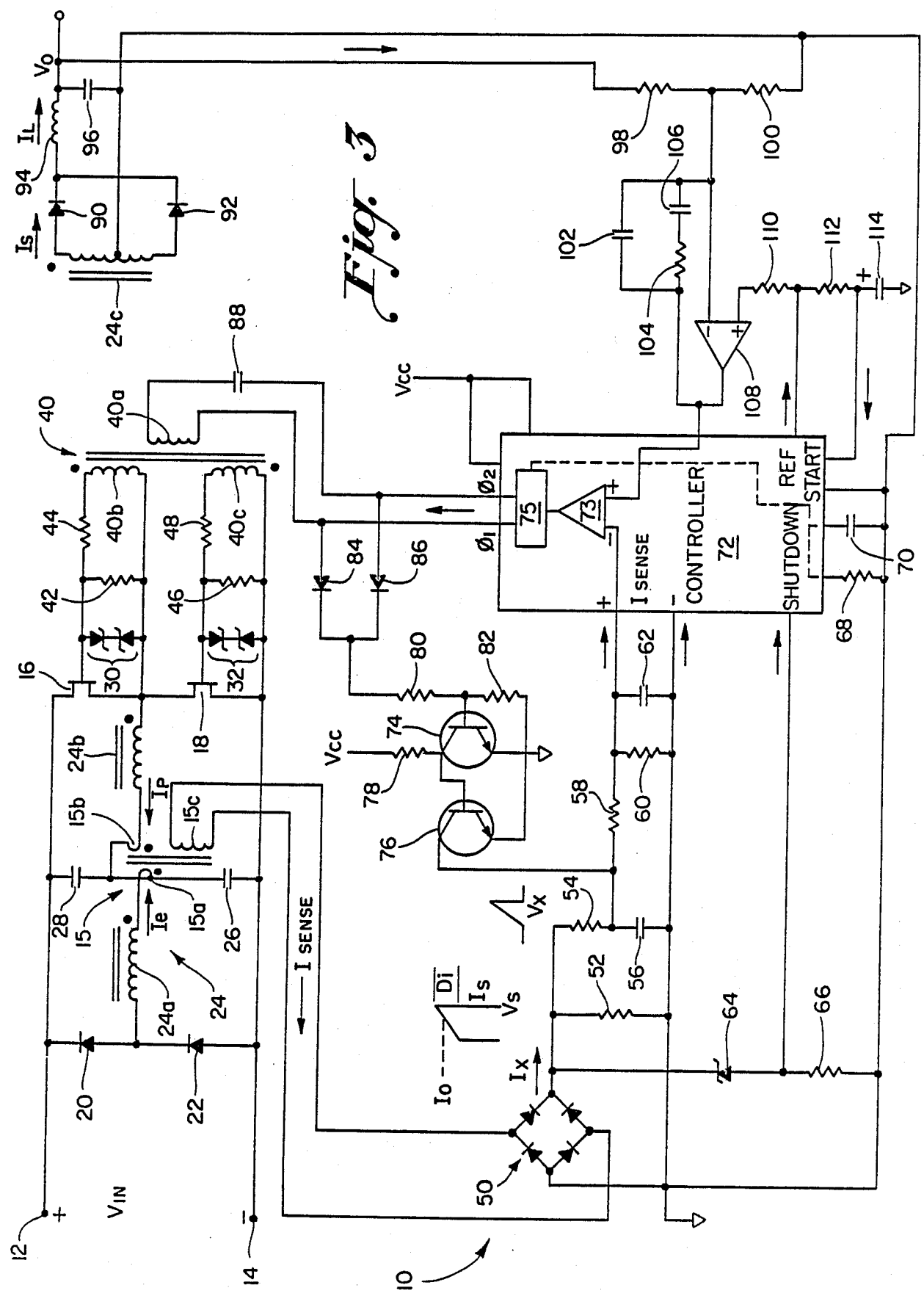
FIG. 3 a schematic diagram of a current mode control circuit for a half-bridge converter in accordance with the present invention.
Figure 1A:
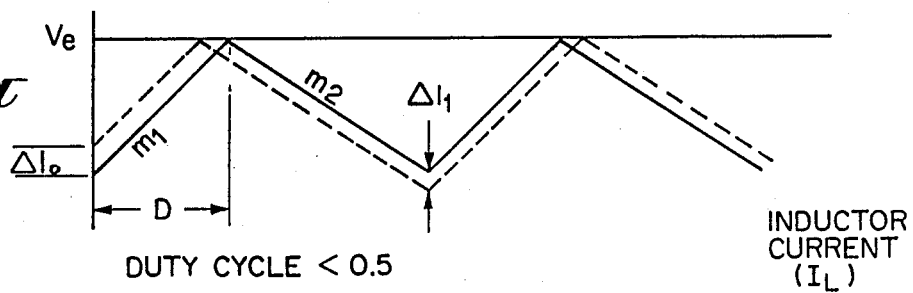
FIGS. 1a and 1b illustrate the variation of inductor current waveform $I_L$ of a current mode half-bridge converter as a function of error voltage $V_e$ wherein is depicted the manner in which a small inductor current perturbation $\Delta I_o$ increases with each switching cycle when the switching elements operate at a duty cycle in excess of 50%.
Figure 1B:
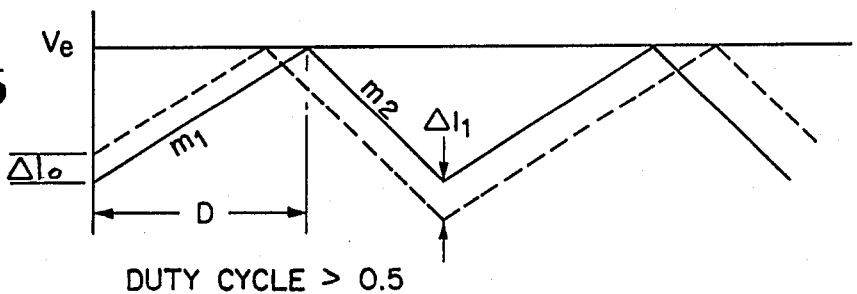
Figure 2A:
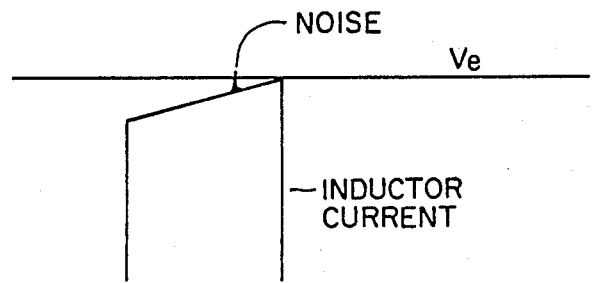
FIGS. 2a and 2b illustrate the manner in which a small noise spike results in significant pulse width variation in a half-bridge converter where the inductor DC current is large with respect to its AC component.
Figure 2B:
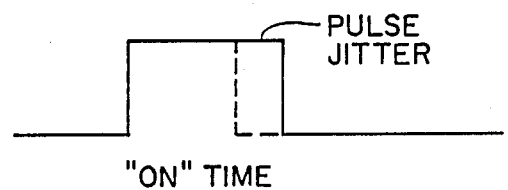

Referring to FIG. 3, there is shown in schematic diagram form a half-bridge converter 10 with current mode control in accordance with the principles of the present invention.

The half-bridge converter 10 includes first and second field-effect transistors (FETs) 16 and 18 respectively coupled to input terminals 12 and 14 for receiving a DC input voltage $V_{IN}$ therefrom. A current sense transformer 15 and an output transformer 24 are coupled across the first and second FETs 16 and 18 as well as across the input terminals 12 and 14. With a direct voltage $V_{IN}$ applied to the input terminals 12 and 14 and with the first and second FETs 16, 18 alternately rendered conductive, a direct voltage is provided to the current sense and output transformers 15 and 24. The current sense transformer 15 includes first, second and third magnetically coupled windings 15a, 15b and 15c. The output transformer 24 has a plurality of magnetically coupled windings including an equalizing winding 24a, a primary winding 24b and a secondary winding 24c.

In order to apply current mode control to the half-bridge converter 10 without causing a runaway condition wherein one of the capacitors 26 or 28 in a voltage divider circuit completely discharges, the voltages across each of the aforementioned capacitors must be equalized. In order to equalize the voltages across capacitors 26 and 28, diodes 20 and 22 are respectively coupled across these capacitors. Thus, when the first FET 16 conducts, a voltage is impressed across the primary winding 24b of the output transformer 24 and is reflected on its equalizing winding 24a. This first voltage is also applied across capacitor 28 and if greater than the voltage applied across capacitor 26, the voltage reflected on the equalizing winding 24a, which has the same number of turns as primary winding 24b, will forward bias diode 22 rendering it conductive. Similarly, during the time the second FET 18 conducts, the voltage across capacitor 26 is reflected to the equalizing winding 24a of the output transformer 24 and diode 20 will be rendered conductive if the voltage across capacitor 26 exceeds the voltage across capacitor 28. Thus, the equalizing winding 24a of the output transformer 24 in combination with diodes 20 and 22 equalizes the voltages across capacitors 26 and 28 in preventing the aforementioned runaway operating condition in the half-bridge converter 10. In preventing runaway operation of the half-bridge inverter 10 with current mode control, the present invention detects and balances the charge conducted by each of the first and second FETs 16 and 18, rather than the respective conduction times, to provide a balanced output voltage $V_o$ from the secondary winding 24c of the output transformer 24.

The first winding 15a of the current sense transformer 15, which has the same number of turns as its second winding 15b, is coupled in series to the equalizing winding 24a of the output transformer 24. Similarly, the second winding 15b of the current sense transformer 15 is coupled in series with the primary winding 24b of the output transformer. Thus, the output transformer's equalizing winding 24a provides a current $I_e$ to the first winding 15a of the current sense transformer 15, while the primary winding 24b of the output transformer provides a current $I_p$ to the second winding 15b of the current sense transformer. The third winding 15c of the current sense transformer 15 is magnetically coupled to the first and second windings 15a and 15b thereof and is responsive to a difference in the currents in the first and second windings.

Sensing the reflected inductor current on the primary winding 24b makes the present invention highly sensitive to small currents in the primary winding and allows for the control of multiple outputs from the converter since current in the transformer's primary winding is used for regulation rather than the current in any secondary winding. Not only is the current through the primary winding 24b reflected into the equalizing winding 24a, but the current within the equalizing winding is also reflected into the primary winding. The sum of the ampere-turns in a transformer must equal 0 as shown in the following two equations, where N represents the number of turns in the primary winding 24b and $I_s$ is the current in the secondary winding 24c of the output transformer 24.

$$N I_p - N I_e - N_s I_s = 0 \tag{1}$$

$$I_s = N (I_p - I_e)/N_s \tag{2}$$

$I_s$ is thus proportional to $I_p$ less $I_e$. From FIG. 3, it can be seen that $I_e$ cancels itself with its reflected portion $I_p$ leaving $I_{SENSE}$ proportional only to the $I_s$ inductor current in the secondary winding 24c of the output transformer. Thus, the third winding 15c of the current sense transformer 15 is inductively coupled to the first and second windings 15a, 15b thereof and is responsive to the difference in current in the first and second windings of the current sense transformer for providing a current, $I_{SENSE}$, to half-bridge converter control circuitry. $I_s$ is proportional to and represents the inductor current $I_s$ output of the half-bridge converter 10. The correction current signal $I_{SENSE}$ representing the inductor current $I_s$ is provided to and rectified by a rectifying bridge 50 which outputs a direct current $I_x$. As shown in FIG. 3, $I_x$, or the sensed inductor current, is comprised of a pedestal with a ramp superimposed on the top thereof. A voltage $V_s$ proportional to $I_x$ is generated across resistor 52. The voltage $V_s$ integrated by the combination of resistor 54 and capacitor 56. From FIG. 3, it can also be seen that the integrated voltage $V_x$ exhibits a larger ramp characteristic than the ramp of the sensed current inductor $I_x$ and corresponding voltage $V_s$. The increased ramp characteristic of the integrated voltage $V_x$ facilitates detection of the ramp signal. The integrated ramp voltage $V_x$ is then filtered and divided down by the combination of resistors 58 and 60 and capacitor 62 and the ramp voltage is provided to the current sense input pins of a power supply controller integrated circuit (IC) 72. The current provided to the current sense input pins of the controller represents the average inductor current rather than the instantaneous inductor current. Resistor 58 and capacitor 62 remove high frequency spikes from the ramp signal provided to the current sense input pins of the power supply controller 72. Resistor 60 serves as a scaling resistor, with its value selected in a preferred embodiment such that the maximum differential peak voltage at the current sense input pins of the controller 72 is 1 volt, which occurs at minimum input voltage and maximum load. The 1 volt is the maximum differential voltage of a current sense amplifier (not shown) within the controller 72 used in a preferred embodiment. A large voltage at the current sense amplifier pins provides better noise immunity.

The controller 72 utilized in a preferred embodiment of the present invention is the UC 3846 power supply controller which is available from various integrated circuit manufacturers and is well known to those skilled in the art. The controller 72 is energized by a $V_{cc}$ input voltage. Because of the delay associated with the integrating circuit comprised of resistor 54 and capacitor 56, a Zener diode 64 is coupled between the output of the rectifying bridge 50 and a SHUTDOWN input pin of the controller 72 to sense higher than normal currents. With the cathode of Zener diode 64 coupled to the output of the rectifying bridge 50 and with its anode coupled to the SHUTDOWN pin of the controller 72 as well as to neutral ground potential via biasing resistor 66, a higher than normal current $I_x$ causes Zener diode 64 to conduct resulting in the shutdown of the controller 72 and termination of its outputs to the first and second FETs 16, 18. With the FETs 16 and 18 no longer alternately rendered conductive, the converter 10 ceases operation. In a preferred embodiment, Zener diode 64 is selected to break down with 18 volts applied thereacross corresponding to a maximum FET current of approximately 3 amps.

The value of a resistor 112 coupled between a reference (REF) output pin and a START input pin of the controller 72 determines whether the controller executes a full shutdown or only terminates the current cycle. In a preferred embodiment, when resistor 112 is provided with the value of 6.8 Kohms or larger, the controller 72 performs a cycle by cycle current limiting in the event an excess current is detected by Zener diode 64. With resistor 112 provided with a value of 1.5 Kohms or less, the controller 72 executes a full shutdown, requiring a recycling of a bias voltage to re-start the controller. A slow start of the controller 72 is provided by grounded capacitor 114 which is charged by the REF output of the controller 72 and discharges to its START pin. Capacitor 114 has an assigned value of 47 micro $\mu F$ in a preferred embodiment. Resistor 68 and capacitor 70 form an RC timing network which functions as an oscillator in providing a clock input to the controller 72 for the proper operation thereof.

Diodes 90 and 92 provide a DC output voltage $V_o$ from the secondary winding 24c of the output transformer 24. The combination of inductor 94 and capacitor 96 serves as a high frequency filter with respect to the output signal $V_o$. The output voltage $V_o$ is fed back via voltage dividing resistors 98 and 100 to one input of an error amplifier 108. To the other input of the error amplifier is provided a reference voltage from the reference (REF) output pin of the controller 72 via a voltage dividing network comprised of resistors 110 and 112. The reference voltage provided to the positive input pin of the error amplifier 108 is compared with the divided-down output voltage $V_o$, with the error amplifier providing an appropriate output in accordance with this comparison. The combination of series coupled resistor 104 and capacitor 106 connected in parallel with capacitor 102 is coupled between the negative input pin of the error amplifier 108 and its output pin and serves as a lead-lag compensation network to ensure stable operation of the controller 72. Although not shown in FIG. 3, in a preferred embodiment of the present invention where the UC 3846 power supply controller is utilized, the error amplifier 108 is located within the controller IC 72.

The output of the error amplifier 108 is provided to one input of a comparator 73 within the controller 72. To the other input of the comparator 73 is provided the positive current sense input which has been integrated by the combination of resistor 54 and capacitor 56 as previously described. The output of comparator 73 is provided to a flip-flop 75 within the controller 72 which, in turn, alternately outputs first and second pulsed signals $\phi_1$ and $\phi_2$. The output pulses $\phi_1$ and $\phi_2$ from the flip-flop circuit 75 in the controller 72 are provided via coupling capacitor 88 to the primary winding 40a of a gate drive, or isolating, transformer 40. Comparator 73 is thus responsive to the output of the error amplifier 108 as well as to the positive current sense input to the controller 72. Thus, when the output voltage $V_o$ is low, the output of the error amplifier 108 goes high because the error amplifier operates as an inverting amplifier. With the output of the error amplifier 108 provided to the positive input pin of the comparator 73 and the current sense input provided to its negative input pin, when the output of the error amplifier exceeds the positive current sense input to the controller indicating a low $V_o$ output voltage, the pulse width of the pulses output from the comparator 73 increases accordingly. The output pulses from the comparator 73 are provided to the flip-flop 75 which alternately provides first and second pulsed outputs $\phi_1$ and $\phi_2$. The increase in the pulse width of the pulses provided to the flip-flop 75 results in a corresponding increase in the pulse widths of its outputs $\phi_1$ and $\phi_2$ which are provided to the primary winding 40a of the gate drive transformer 40.

The gate drive transformer 40 includes a pair of secondary windings 40b and 40c each magnetically coupled to its primary winding 40a. In addition, secondary winding 40b is coupled across the gate and source of the first FET 16, while secondary winding 40c is coupled across the gate and source of the second FET 18. It is by means of the output pulses $\phi_1$ and $\phi_2$ from the controller 72 alternately provided to the primary winding 40a of the gate drive transformer 40 that the first and second FETs 16 and 18 are alternately rendered conductive for driving the output transformer 24. A first pair of opposed Zener diodes 30 is also coupled across the first FET 16 for limiting the gate-to-source voltage applied across the FET. Similarly, a second pair of opposed Zener diodes 32 is coupled across the second FET 18 to limit the gate-to-source voltage applied thereacross. In a preferred embodiment, the first and second pairs of Zener diodes 30, 32 respectively limit the gate-to-source voltages across the first and second FETs 16 and 18 to less than ±10 volts. Resistors 42 and 46 respectively coupled across secondary windings 40b and 40c and further coupled to the first FET 16 and the second FET 18 ensure that the voltage on its associated secondary winding goes to 0 in the absence of either the $\phi_1$ or $\phi_2$ pulse in the primary winding 40a of the gate drive transformer 40. Resistors 44 and 48 serve as damping resistors to prevent unwanted oscillation of the FETs which sometimes arises due to their gate-to-source capacitance resonating with the inductance in a winding coupled thereto.

The pulsed outputs $\phi_1$ and $\phi_2$ of the controller 72 are also respectively provided to diodes 84 and 85. Diodes 84 and 86 are, in turn, coupled via a voltage dividing network comprised of resistors 80 and 82 to the base of a first NPN transistor 74. The supply voltage $V_{cc}$ is coupled across the first NPN transistor 74 via resistor 78, with the collector of the first NPN transistor coupled to the base of a second NPN transistor 76. The collector of the second NPN transistor 76 is coupled between the integrating network comprised of resistor 54 and capacitor 56 and the current sense input of the controller 72.

The flip-flop 75 within the controller 72 is coupled to the oscillator network of the controller which includes resistor 68 and capacitor 70 and receives timing signals therefrom. In response to the timing signals provided from resistor 68 and capacitor 70, the flip-flop 75 limits the duty cycle of each of its pulsed outputs $\phi_1$ and $\phi_2$ to less than 50%. The "dead time" during which neither the $\phi_1$ nor the $\phi_2$ pulse occurs is determined by the value of capacitor 70. With diodes 84, 86 alternately rendered conductive by a respective output $\phi_1$ and $\phi_2$ from the controller 72, the outputs of these two diodes are inverted by the first NPN transistor 74 and are provided to the base of the second NPN transistor 76 for rendering the second NPN transistor nonconductive. However, when neither diode 84 nor diode 86 is conductive during the short period when neither $\phi_1$ nor $\phi_2$ is high, i.e., during the aforementioned "dead time," the first NPN transistor 74 will be turned off, rendering the second NPN transistor 76 conductive. With the collector of the second NPN transistor 76 coupled to the integrating network comprised of resistor 54 and capacitor 56, when the second NPN transistor is rendered conductive, capacitor 56 will be discharged to ground via the two coupled NPN transistors. Since the time the two pulsed outputs $\phi_1$ and $\phi_2$ of the controller 72 are low represents the end of a cycle, capacitor 56 will be fully discharged at the end of each operating cycle of the half-bridge converter 10. This ensures that errors arising from switching element duty cycles in excess of 50% will not cumulate from switching cycle to switching cycle.

There has thus been shown a current mode control for a DC converter operating over 50% duty cycle which compensates for converter noise susceptibility arising from continuous inductor current operation by integrating the current sense waveform rather than using the actual inductor current waveform. The output of the integrator is reset to 0 before each new cycle in allowing integration to always start from 0 in eliminating errors from instabilities which are cumulative from cycle to cycle. The current sensed waveform is a sawtooth ramp and represents the average inductor current rather than the instantaneous inductor current for eliminating feedback instability in the current mode control system when the duty cycle of the switching elements exceeds 50% since the current ramp in each cycle starts from 0. The sensed inductor current is thus converted from a generally trapezoidal to a triangular waveform which reduces the gain required in a comparator stage for detecting the sensed inductor current.

While particular embodiments of the present invention have been shown and described, it will be obvious to those skilled in the art that changes and modifications may be made without departing from the invention in its broader aspects. For example, while the present invention has been described for use in a half-bridge converter, various aspects of this invention such as the integration and detection of the sensed inductor current also have application in flyback, forward and other types of converters. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

We claim:

1. In a DC converter wherein an input DC voltage is converted to an output DC voltage, said converter including an output transformer having a primary winding for conducting a first input current in response to said input DC voltage, a secondary winding electromagnetically coupled to said primary winding and responsive to said first input current for conducting a seocnd output current in generating said output DC voltage, and a current equalizing winding coupled to said primary winding for reflecting said first input current, said converter further including first and second switch means operating at a duty cycle in excess of 50% and coupled to said primary winding and alternately rendered conductive during an operating cycle of the converter for providing said first input current thereto, a current mode control arrangement comprising:

current sensing mean including a current sensing transformer coupled in circuit with said output transformer for sensing the first input current in the primary winding of said output transformer, said current sensing transformer including first and second windings respectively coupled to the output transformer's primary and current equalizing windings, said current sensing transformer further including a third winding electromagnetically coupled to said first and second windings for detecting the difference in current in said first and second windings, wherein the difference in current in said first and second windings corresponds to the first input current and represents said second output current;

integration means coupled to said current sensing means for integrating said first input current in providing a third current representing an average of said second output current; and control means coupled to said first and second switch means and to said integration means and responsive to said third current for alternately providing first and second drive signals to said first and second switch means in a balanced manner such that said first and said second switch means provide an equal charge to the primary winding during an operating cycle of the DC converter.

2. The current mode control arrangement of claim 1 wherein said current equalizing and primary windings of the output transformer are coupled in circuit to said first and second switch means.

3. The current mode control arrangement of claim 1 further including reset means coupled to said integration means and to said control means and responsive to said first and second drive signals for resetting said integration means at the end of each operating cycle of the converter.

4. The current mode control arrangement of claim 3 wherein said integration means includes an RC network.

5. The current mode control arrangement of claim 4 wherein said reset means includes a grounded transistor circuit responsive to said first and second drive signals and rendered conductive thereby for discharging said RC network to neutral ground at the end of each operating cycle of the converter.

6. The current mode control arrangement of claim 1 further including shutdown means coupled to said control means and responsive to the first input current for terminating the operation of said control means and shutting down the converter when the first input current exceeds a predetermined value.

7. The current mode control arrangment of claim 6 wherein said shutdown means is further coupled to said current sensing means and includes a grounded Zener diode.

8. The current mode control arrangement of claim 1 further including timing means coupled to said control means for establishing the duty cycle of the first and second switch means.

9. The current mode control arrangement of claim 8 wherein said timing means includes an RC network.

10. The current mode control arrangement of claim 1 wherein each of said switch means comprises a field-effect transistor.

11. The current mode control arrangement of claim 1 further including feedback means coupling the secondary winding of said output transformer to said control means for providing a feedback correction signal thereto, wherein said control means compares said third current with said feedback correction signal in regulating the first and second drive signals respectively provided to the first and second switch means.

12. The current mode control arrangement of claim 11 wherein said feedback means includes an error amplifier for comparing the second output current with a reference current level in generating said feedback correction signal.

13. The current mode control arrangement of claim 12 wherein said control means regulates a pulse width of each of said first and second drive signals respectively provided to the first and second switch means in response to a comparison of said third current with said feedback correction signal.

14. The current mode control arrangement of claim 1 wherein said DC converter is a half-bridge converter.

* * * * *